March 2, 1965      I. E. BIRDSALL      3,171,217
EDUCATIONAL APPARATUS FOR TEACHING MATHEMATICS
Filed Jan. 3, 1962      2 Sheets-Sheet 1
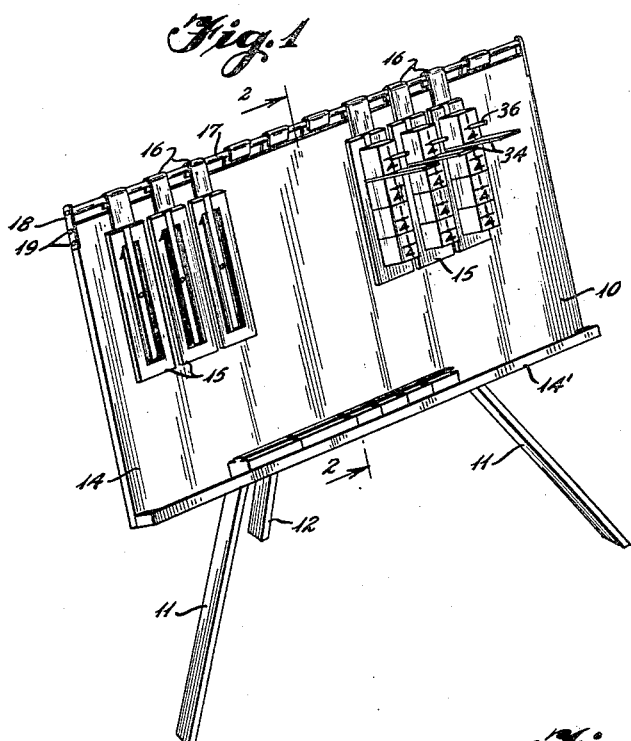
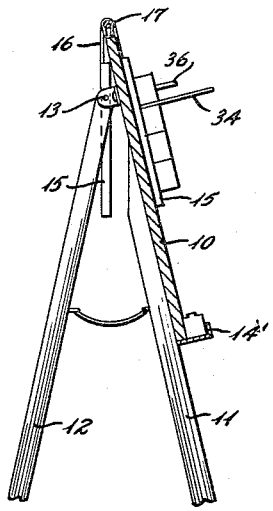
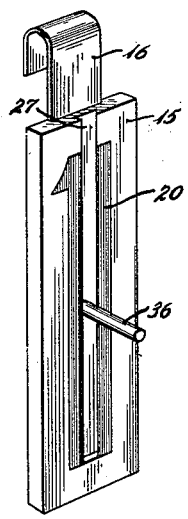
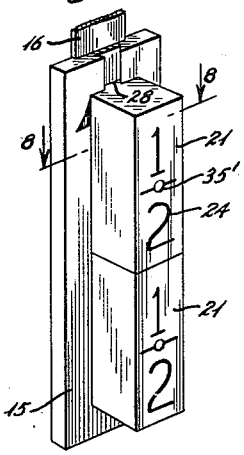
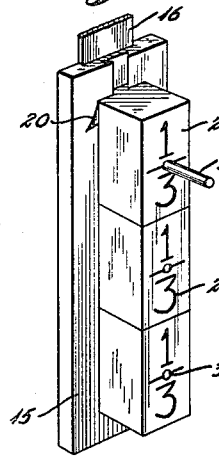
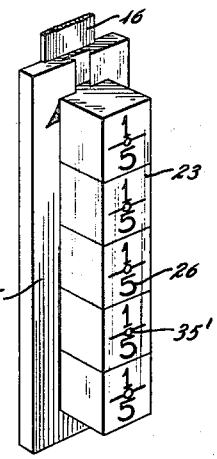
INVENTOR
*IDA E. BIRDSALL*
BY
ATTORNEY March 2, 1965     I. E. BIRDSALL     3,171,217
EDUCATIONAL APPARATUS FOR TEACHING MATHEMATICS
Filed Jan. 3, 1962     2 Sheets-Sheet 2
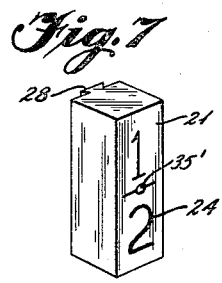
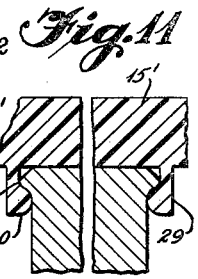
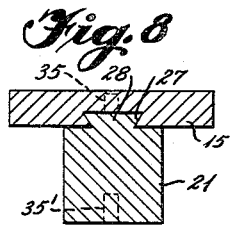
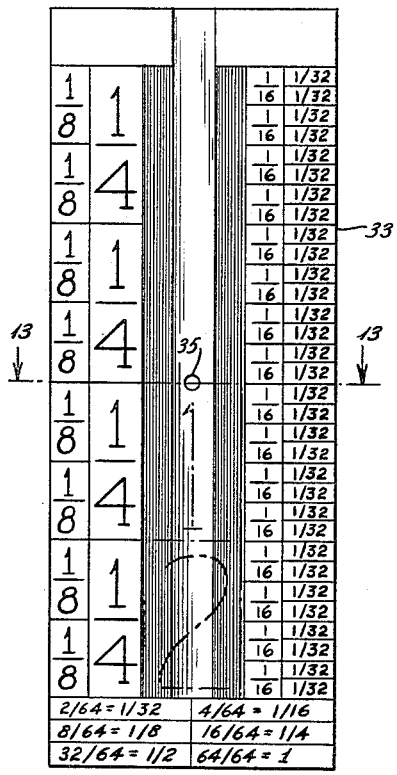
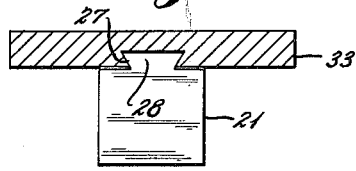
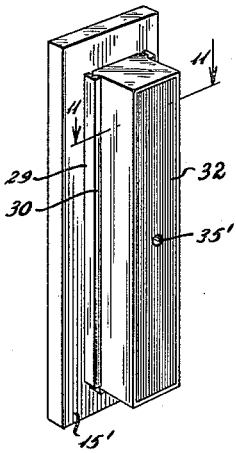
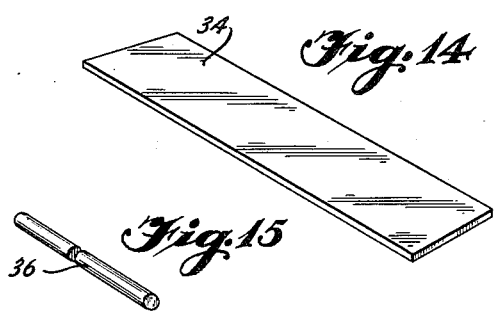
INVENTOR
IDA E. BIRDSALL
BY
ATTORNEY United States Patent Office 3,171,217
Patented Mar. 2, 1965

3,171,217
EDUCATIONAL APPARATUS FOR TEACHING
MATHEMATICS
Ida E. Birdsall, 38 Main St., Manasquan, N.J.
Filed Jan. 3, 1962, Ser. No. 164,052
6 Claims. (Cl. 35—31)

This invention relates to teaching or the imparting of information or knowledge, including to children of preschool and early school ages and to older uneducated persons, and to such teaching will be of value and constitute an important part of the general education and training and contribute to the mental development of the individual.

The invention relates particularly to the teaching of mathematics and to apparatus and equipment employed in giving instruction in such subject and by which the attention of the pupil can be attracted and retained sufficiently and repetitively to promote the accelerated acquisition of knowledge as well as to create and cultivate the ability to make computations and calculations in addition, subtraction, multiplication, and division.

It is well known that in the initial stage of the education of children of preschool and early school ages that their attention can be retained only for a limited period and various ways have been undertaken to teach elementary mathematics so essential in the educational development and welfare of the individual in the building of good citizens. Various methods have been undertaken in an effort to attract and maintain the attention and interest of the child including by repetitive effort sometimes apparently without results in attempting the initial teaching of mathematics.

It is an object of the invention to teach the meaning, and compositive value of fractions, as well as the ability to raise or reduce a fraction to a higher or lower value, and the ability to solve problems involving fractions.

Another object of the invention is to provide an improved method of teaching mathematics utilizing a novel educational device, apparatus, or equipment, in so doing, and which will result in accelerated acquisition of knowledge.

Another object of the invention is to provide an educational device or apparatus for the teaching of mathematics which will attract the attention of the uneducated, whether children or older persons, will elicit the exercise of the visual, vocal, auditory, and manual faculties, to develop the ability to make mathematical computations, and which will result in a prolonged interest, and will accelerate the development of the mental faculties.

A further object of the invention is to provide for the teaching of mathematics an educational device in the form of a holder with multiple unit members selectively prominently displayed thereon, each unit having an appearance and a configuration to represent a key value and adapted to receive complementary fractional units, the sum of a number of which corresponding to the fractional value of a complete unit, the fractional value units being of a length corresponding to the fractional value which they represent and preferably are of approximately one inch by one inch in width and thickness for ease in grasping, applying, and removing the fractional unit from the full unit.

Other objects and advantages of the invention will be apparent from the following description taken in conjunction with the accompanying drawing wherein:

FIG. 1 is a perspective of a multiple unit easel type display holder illustrating one application of the invention;

FIG. 2, a section on the line 2—2 of FIG. 1;

FIGS. 3, 4, 5 and 6, perspectives of whole and fraction blocks;

FIG. 7, a perspective of one of the fraction units or blocks;

FIG. 8, a horizontal section on the line 8—8 illustrating the joint through one of the whole and fractional units;

FIG. 9, a perspective of a whole and fractional unit having a modified form of connection therebetween;

FIG. 10, a perspective of the fractional unit of FIG. 9 detached;

FIG. 11, a horizontal section on the line 11—11 of FIG. 9;

FIG. 12, a perspective of one of the fraction rulers or measurers;

FIG. 13, a section on the line 13—13 of FIG. 12;

FIG. 14, a perspective of one of the fraction separators; and

FIG. 15, a perspective of one of the designating pegs.

Briefly stated, the educational device of the present invention for teaching mathematics comprises a multiple unit easel-mounted holder having a display area on which are adapted to be selectively prominently displayed a number of multiple units and fractional units and with a multiple visible physical relation therebetween, portraying the relation of the fractional units to smaller and larger fractional units as well as to the complete unit, the fractional units being of a length corresponding to the fractional value and of a size and configuration approximately one inch by one inch in width and thickness for ease of grasping, applying and removing upon the complete unit, with each of the whole units swingable from a position behind the easel-mounted holder to a display position in front of the same.

With continued reference to the drawings, the educational device or apparatus for teaching mathematics in accordance with the present invention comprises a holder 10 mounted on fixed legs 11 and a third leg 12 pivoted on a hinge 13 to the holder 10.

The holder 10 comprises a flat panel structure 14, the lower horizontal portion 14' which may also serve as a chalk tray and support for elongated strips or whole unit members 15 and fractional units or blocks.

A plurality of the board-like strips or whole unit members 15 are provided for spaced vertical positioning in transverse alignment on the front of the holder 10 and such strips or unit members may have attached thereto hook type hinge members 16 which pivotally fit upon a rod 17 mounted in angular mounting end members 18 secured by fasteners 19 to the holder 10. Thus the complete units may be swung from front to rear and the reverse and may be easily detached and replaced to vary the order of their arrangement.

Each board-like strip or unit member 15 represents one complete unit and has on its face a representation 20 of the numeral 1 and of a size which substantially covers the face of the unit. Each board or whole unit member 15 is adapted to receive complementary fractional blocks or units 21, 22, 23, etc., such fractional blocks or units having respectively numbers 24, 25, 26 thereon corresponding to the number or value of the fractional block or unit and each fractional block or unit being of a length corresponding to the fractional value thereof as compared to the complete unit. Also the fractional blocks or units 21, 22, 23, 24 preferably are approximately one inch by one inch in width and thickness for ease of grasping in order to apply the same to and remove the same from the whole block or unit.

In order to fit the fractional units upon the complete units, the complete units may be provided with complementary portions by which they may be held in assembled relation. For example the complete unit may have a dovetail slot 27 adapted to receive a dovetail 28 on the back of the fractional unit or if preferred as shown in FIG. 9 the complete unit may be of the construction of FIG. 9 and have outwardly extending parallel portions 29 with inturned flanges 30 which extend over the lateral edges 31 of a block 32.

In like manner other fractional blocks may be provided of 1/6, 1/7, 1/8, 1/9, and 1/10, and if desired additional fractions of 1/11 and higher may be added. Ordinarily it is not considered necessary to use fraction blocks or units of smaller value.

The invention also contemplates the use of fraction rulers or measurers 33 by which fraction units of various values can be measured. Also in the use of the device fraction separators 34 may be employed. These also preferably are relatively thin by one inch wide and four or five inches in length.

In use the fraction rulers or measuring devices may be used to illustrate the value of the unit members, and the fraction separators may be used to illustrate the solution of problems.

The complete unit 15 is adapted to receive the fractional units of various lengths according to the fractional values of each and preferably one inch by one inch in width and thickness so that they may be easily grasped for inserting or removing from the complete unit in which they are received.

Each of said fractional units is painted or otherwise indicated with their own fractional values such as in FIGURE 4 ½ unit block and of a size to indicate that it is one-half of the complete unit block, and that two of such ½ blocks represents the entire value of the complete unit block if the latter is divided into two equal parts as indicated.

On the other hand if the complete unit block is divided into three equal parts as illustrated by the fractional block or unit of FIG. 5, then each of the three parts indicates ⅓ on its surface and is of corresponding size so that it can be readily observed and compared with the complete unit block and the ½ and other fractional blocks so that it can be realized that the ½ fractional block is greater than the ⅓ fractional block and the ¼ fractional block is less than the ⅓ block unit, and two of which equal the one ½ unit block.

The fractional rulers are designed to facilitate the usage of known or found fractions. A child by placing a fraction block in the proper position with relation to the proper ruler can quickly express the fraction in higher or lower terms without changing its value such that he can see ½ fraction unit equals two of the ¼ units, or ⅜ or ⅘ of the other fraction units. This may be necessary to add or subtract two unlike fractions. The rulers should be of the same height as the whole units of FIG. 1 so that the same chosen unit may be applied to either to verify the value.

The fraction separators may be made of cardboard, plastic, or the like material and preferably are about one inch wide by four or five inches long so that each may be grasped in the hand and inserted and removed from between the fraction blocks and to separate sectional parts of a complete unit to indicate one or more of the fractional parts of the unit are being used for the same purpose.

The fraction separators are used also in conjunction with the manipulation of the blocks as is necessary in the completion of the four processes worked with fractions, namely addition, subtraction, multiplication and division.

The separators illustrate how a problem may be solved. For example, as in FIG. 1, if four boys wish to divide three sticks of candy equally, to determine how much each would receive there would be three unit boards representing the three sticks of candy and since they were to be divided into four parts, each of the blocks would be so divided by substituting the equivalent ¼ unit blocks in each of the complete blocks. In other words it is possible to add all of the ¼ blocks together and divide them into four parts or to use separators to show how each boy will receive ¼ of the 3 whole units or blocks. One boy receives ¼ of one, and ¼ of one, and ¼ of one, making ¾ of the 3 ones, in all ¾ of 3. It is readily seen and the meaning clear that 3 divided by 4 equals ¾ or stated another way, that ¼ of 3 equals ¾.

To facilitate the use of the boards and fractional unit members and to indicate the specific board and unit member being considered, the board 15 may be provided with a hole or bore 35 and the fractional unit member may be provided with a hole or bore 35' of corresponding size in which the end of a designating peg 36 is receivable. Thus in the specific board 15, as for example in FIG. 3, the peg 36 is inserted in the center of the unit number 1 thereon and if the fraction is one-third as in FIG. 5, the peg will be inserted in one of the three one-third units designating the whole unit and the fractional unit under consideration.

Short cut rules may come later after the understanding is established. Many kinds of problems may be taught with meaning and understanding by using the blocks and separators together.

The holder may be an upright self-supporting solid frame or panel with folding legs to establish a tilt and with the supporting ledge across the bottom to hold in place one or more of the receiving units or boards to be placed side by side close together and on end. Across the rear top back of the easel may be fastened a desired number, for example, nine spacers of thin strips of wood, plastic or other material at intervals and so fastened that one or more or all can be swung to the front over the top of the holder to separate groups of receiving blocks or units or whatever is needed at the moment to solve the problem.

It will be obvious to one skilled in the art that various changes may be made in the invention without departing from the spirit and scope thereof and therefore the invention is not limited by that which is illustrated in the drawings and described in the specification, but only as indicated in the accompanying claims.

Wht is claimed is:

1. An educational device for use in the teaching of mathematics comprising
   (1) a multiple unit easel mounted holder,
      (a) said holder having a display area for the display of multiple whole and fractional units,
      (b) a bar fixed to said holder in spaced relation thereto,
   (2) multiple whole and fractional units
      (a) having multiple visible physical relation therebetween of appearance and size portraying the relation of the fractional units to the whole units and to larger and smaller fractional units,
      (b) the fractional units being of a length corresponding to their fractional value,
         (1) and of a size and configuration for ease of grasping and applying from the whole units,
      (c) means swingably and detachably mounting said whole units on said bar,
      (d) cooperating dovetail and groove fastening means for attaching said fractional units in single or multiple to said whole units,
   (3) fraction unit separators, and
   (4) fraction unit measuring rulers by which said units may be evaluated.

2. An educational device for use in the teaching of mathematics comprising a multiple unit easel mounted panel-type holder, said holder having a display area for the display of multiple whole and fractional units, a horizontal bar fixed to said holder in vertically spaced relation thereto, multiple whole and fractional units having multiple visible physical relation therebetween of appearance and size portraying the relation of the fractional units to the whole units and to larger and smaller fractional units, the fractional units being of a length corresponding to their fractional value, and of a size and configuration for ease of grasping and applying from the whole units, means hingedly mounting said whole units on said bar for movement between the front and rear of said holder, cooperating dovetail and groove fastening means for attaching said fractional units in single or multiple to said whole units, fraction unit separators, and fraction unit measuring rulers by which said units may be evaluated.

3. An educational device for use in the teaching of mathematics comprising a multiple unit easel mounted flat holder, said holder having a display area for the display of muliple whole and fractional units, a bar fixed to said holder in spaced relation thereto, multiple whole and fractional units having multiple visible physical relation therebetween of appearance and size portraying the relation of the fractional units to the whole units and to larger and smaller fractional units, the fractional units being of a length corresponding to their fractional value, and of a size and configuration for ease of grasping and applying from the whole units, means pivotally mounting said whole units on said bar for selective grouping and movement between the front and rear sides of said flat holder, and cooperating dovetail and groove fastening means for attaching said fractional units selectively in single or multiple arrnagements to said whole units.

4. An educational device for use in the teaching of mathematics comprising a holder having a flat display area thereon, multiple whole and fractional units, said whole and fractional units having multiple visible physical relation therebetween of appearance and size portraying the relation of the fractional units to the whole units and to larger and smaller fractional units, the fractional units being of a length corresponding to their fractional value of the whole units, means for pivotally connecting said whole units to said holder for movement onto said display area, and cooperating dovetail and groove fastening means for attaching said fractional units in single or multiple to fronting faces of said whole units, said fractional units being of a size and configuration to extend forwardly of the fronting faces of said whole units to provide for grasping ease in applying or removing them from the whole units.

5. An educational device for use in the teaching of the relationship between whole and fractional units comprising planar mounting means, a series of whole value units, means pivotally mounting said series of whole value units in selectively locatable and transversely aligned spaced positions on said planar mounting means, said unit mounting means including means whereby said units are disposable in a position where they can be seen from the front of said planar mounting means or pivotal to a position where they will be concealed from the front of said planar mounting means, said last-mentioned means being of a construction whereby said units may be selectively mounted on and removed from said pivotal mounting means, and a series of fractional value units which when combined in the number of the fraction constitute a whole unit, and interengaging means between said fractional and whole units and serving to fasten the fractional units onto the fronting faces of the whole units, said fractional units being of such size and shape as to extend forwardly from said fronting faces of the whole units sufficiently for easy manual grasping thereof for mounting on or removal from said whole units.

6. Educational apparatus for use in the teaching of mathematics comprising a support structure, a series of independent whole units, means on said support structure for individually pivotally and removably mounting said independent whole units in spaced relation on said support structure, a series of fractional units, means for removably mounting said fractional units on said whole units, said fractional units being of a size that when a number of such fractional units are combined corresponding to the fraction they represent, they constitute both in size and value a whole unit, said whole and fractional units being provided with readily perceptible identification means indicative of their size and value whereby said whole and fractional units may be associated together to teach the fundamental processes of mathematics relative to fractions.

References Cited by the Examiner
UNITED STATES PATENTS

| | | | |
|---|---|---|---|
| 1,649,578 | 11/27 | Deming | 35—31.4 |
| 2,494,469 | 1/50 | Booth | 35—31.4 |
| 2,530,447 | 11/50 | Birdsall | 35—70 X |
| 2,803,069 | 8/57 | Struna | 35—31.2 |
| 2,809,443 | 10/57 | Hospodar | 35—31.4 X |
| 2,835,988 | 5/58 | Hilkene | 35—31.4 |

FOREIGN PATENTS 24,054   10/56   Great Britain.

CHARLES A. WILLMUTH, *Primary Examiner*.

L. SMILOW, LAWRENCE CHARLES, JEROME SCHNALL, *Examiners*.